3,250,697
SWEETENING PROCESS USING AMMONIA
AS CATALYST
Charles J. Walters, Ras Tanura, Robert E. Messinger, Dhahran, and John A. Schnautz, Ras Tanura, Saudi Arabia, assignors to Arabian American Oil Company, a corporation of New York
No Drawing. Filed Dec. 12, 1963, Ser. No. 329,940
9 Claims. (Cl. 208—207)

Our invention relates to a process for treating liquid crude petroleum hydrocarbons containing objectionable amounts of hydrogen sulfide and more specifically relates to a process for treating liquid petroleum crude oils to reduce the amount of hydrogen sulfide contained therein by converting it to an innocuous material.

In the handling of crude oils containing hydrogen sulfide, for example in storage in tanks or transportation on tankers or by other means, the hydrogen sulfide in the oil presents a danger to personnel due to the toxicity of hydrogen sulfide vapors over the crude oil. It is thus desirable to remove the hydrogen sulfide to obviate this problem.

Various methods have been employed to sweeten sour petroleum crudes by removing the hydrogen sulfide contained therein. A widely used method is based on thermal stripping techniques wherein a sour crude is charged to the top of a column containing bubble-cap trays. Passing down through the column the crude is stripped of hydrogen sulfide and light hydrocarbons by vapors driven off the crude in a reboiler at the bottom of the column. The sweet crude is collected at the bottom of the column, cooled and pumped to tankage or to a pipeline. Obvious inherent disadvantages of such a method include a large capital investment for equipment and the necessity for a fully attended operation. The practice of our invention, however, is a substantial improvement over such a method since it eliminates the need for bubble-cap trays and a fired or steam heated reboiler which in turn facilitates substantially unattended operation. Our invention also improves conservation of the charge by decreasing gravity loss from the crude oil.

Another currently practiced method of sweetening sour crudes consists of stripping the hydrogen sulfide from the crude oil with sweet gas. Generally, in this type of process sour crude flows down a column countercurrent to a stream of sweet gas which strips out the hydrogen sulfide. The practice of our invention is also a substantial improvement over this method since it eliminates the need for maintaining complex gas sweetening facilities with a savings in expenditures for equipment and labor. Moreover, no control is necessary to insure substantial non-removal from the crude oil of valuable hydrocarbon constituents by a sweetening gas.

Our invention provides an economically attractive process for sweetening a sour crude and reducing toxicity of vapors over the crude oil by decreasing at least a substantial proportion of the hydrogen sulfide content of the crude by conversion to an innocuous material.

We have found that by bringing together, in contact with crude liquid petroleum hydrocarbons containing objectionable quantities of hydrogen sulfide, an oxygen-containing gas and catalytic amounts of ammonia, the hydrogen sulfide content and thus the toxicity of vapors over the crude can be substantially decreased by conversion of the hydrogen sulfide to an innocuous material, elemental sulfur. We have further found that immediate processing of the treated liquid crude containing the elemental sulfur, formed in the liquid crude from the hydrogen sulfide, to remove the elemental sulfur is generally unnecessary in order to achieve a substantially non-corrosive fluid. Thus, liquid crude oil containing objectionable and potentially dangerous amounts of hydrogen sulfide can be effectively treated by our process to provide a crude safe for handling, particularly in transportation by tanker, without further processing.

In accordance with the process of the invention, an oxygen-containing gas and small catalytic amounts of ammonia are incorporated in a sour crude liquid petroleum. The order of introducing the reagents is not critical but it is preferred that intimate contacting of the gas and the liquid sour crude be established for a more efficient sweetening operation. We have found that intimate contacting of the gas and liquid is important for high reaction rates. Preferably, therefore, the reaction is conducted in a packed column. The sweetening operation can be carried out in the absence of packing material but a less efficient operation results. However, the efficiency of an operation where no packing material is utilized can be materially increased when the time for the reaction can be conveniently lengthened. For example, one situation in which a more efficient operation can be realized, is in the pipeline transportation of the sour crude. Therefore, our invention also provides an economical method of pipeline sweetening of sour crude. Yet another representative situation can be a batch sweetening process in which the oxygen-containing gas and catalyst are brought into intimate contact with the confined sour crude petroleum.

The quantity of oxygen-containing gas present is that sufficient to oxidize the hydrogen sulfide completely to sulfur and it can be supplied to the reactor be it a packed column or to a pipeline or an open vessel, etc., by any convenient means. Generally, the quantity of oxygen-containing gas employed can be varied with good results. In general, a mole ratio of oxygen to hydrogen sulfide of from about 0.5 to about 7:1, preferably about 1.0 to 5:1, gives good results. When a packed column is used a mole ratio of about 2–4:1 is preferred. In pipeline sweetening, a mole ratio of about 1–2.5:1 is preferred. It is preferred also to employ air as the source of oxygen in the process, but other oxygen-containing gases, can be used. When air is used it is supplied generally in amounts of about 2 to 30, preferably 4 to 20 times greater, by weight, than the hydrogen sulfide content of the crude petroleum. Preferably, in a packed column a continuous concurrent contact of the oxygen-containing gas and ammonia catalyst with the liquid crude is employed although the reaction can be carried out using countercurrent flow of the reactants or even in a batch type process by bubbling the gas into the crude being treated.

The amount of ammonia required is relatively small. The ammonia acts as a catalyst for the rapid oxidation of the hydrogen sulfide to sulfur. Oxidation of the hydrogen sulfide proceeds at a much lower rate without the presence of ammonia. It is believed that the overall reaction can be expressed by the following simplified equations:

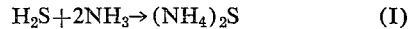
$$H_2S + 2NH_3 \rightarrow (NH_4)_2S \tag{I}$$

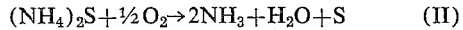
$$(NH_4)_2S + \tfrac{1}{2}O_2 \rightarrow 2NH_3 + H_2O + S \tag{II}$$

We have found that more than the stoichiometric amount of ammonia for complete reaction with hydrogen sulfide, per Equation I, usually does not increase the rate of oxidation and may in fact change the nature of the reaction if sufficient ammonia is added to establish other than acidic conditions in the crude. We have found that as much as ninety-eight percent reduction in hydrogen sulfide content can be achieved with less than 0.5 stoichiometric equivalents of ammonia. About 0.1 to 1 stoichiometric equivalents, preferably about 0.4 to 0.6 stoichiometric equivalents, of ammonia are sufficient to attain substantially complete conversion of the hydrogen sulfide in the crude oil. This corresponds to a molar ratio of ammonia to hydrogen sulfide of about 0.2 to 2:1, preferably 0.8 to 1.2:1. Generally, the weight of ammonia present will be about 0.1 to 1.0 times the hydrogen sulfide content of the crude petroleum or about 2 to 13 weight percent based on the air-ammonia crude sweetening agent. The ammonia can be introduced to the reactor in a gaseous or liquid form. The ammonia is regenerated and can be recovered for reuse if desired.

The process of our invention is operable with petroleum and petroleum products such as crude oil and the distillate oils boiling within the range of from about 100° F. to about 750° F. The crude oil or distillate fraction employed can contain up to about 500 p.p.m. hydrogen sulfide or even more and the process of our invention effectively reduces the amount of hydrogen sulfide to a level safe for handling. By the process of our invention the concentrattion of hydrogen sulfide of such oils can be reduced to a concentration of as low as 20 p.p.m. and below. The process of our invention can be carried out under a wide variety of conditions for bringing about contact between the liquid crude and the oxygen-containing gas to obtain sweetened crude. These conditions can involve combinations of various manipulative steps e.g. upflow, downflow and horizontal flow of the liquid crude, concurrent and countercurrent flow of the gaseous sweetening agent relative to the flow of liquid crude and the use of solid contact materials, in the form of fixed, moving and fluidized beds. Preferably, however, the sweetening process is carried out in a reactor wherein the contact material effectively serves to disperse the two phases. The type of the packing used in a specific instance will generally depend on particular existing conditions such as the density, viscosity and velocity of the liquid crude. Examples of suitable packing material include stainless steel wool, beads, pellets, lumps, chips and the like. Generally, a residence time of the crude oil of between about 15 and 60 minutes is satisfactory. In certain cases, residence times as low as 10 and as high as 90 minutes can be used.

The temperature at which the process is carried out does not appear to be critical variable. Somewhat elevated temperatures up to about 100° F. accelerate the oxidation reaction and even higher temperatures can be used. Elevated temperatures, however, are generally not preferred since they ordinarily require the use of a pressure above atmospheric in order to maintain the crude in liquid form. The time required for the completion of the oxidation reaction will be dependent somewhat upon the nature of the charge stock and upon the several variables of the process including the concentration of hydrogen sulfide, the temperature at which the treated composition is maintained, the quantity of oxygen-containing gas employed, the environment in which effective intimate contact takes place, i.e. in a packed column or in a pipeline or in an open vessel, and the like. It is apparent that sufficient time should be permitted to allow a reduction in the hydrogen sulfide concentration to the value desired which will usually be from a few minutes to several hours. The process is particularly useful in providing sweet crude for transportation by tanker or other means where sweet crude is desired because of the reduced toxicity of its vapors.

The following examples illustrate the process of the invention in which crude petroleum oils having an API gravity range from about 28 to 38 were used. The oils used were Arabian crudes.

EXAMPLE I

A sour crude petroleum oil having a hydrogen sulfide content of about 500 p.p.m. was charged to the bottom of a 3′ x 3″ column at an upflow rate of 25 cc. per minute. The column was packed with a mass of inert gravel particles (⅛″ in diameter). Air was introduced at the bottom of the column at an upflow rate of 25 cc. per minute, providing one stoichiometric equivalent of oxygen as air for complete oxidation of the $H_2S$ to sulfur according to Equations I and II, above. Ammonia was introduced together with the air at an upflow rate of 15 cc. per minute, providing one stoichiometric equivalent of ammonia according to Equation I above. The column was maintained at a pressure of 1 p.s.i.g. and at a temperature of 75° F. The crude petroleum liquid effluent as well as a gas effluent from the column were analyzed for hydrogen sulfide content as well. The results of this run are given in Table I.

EXAMPLES II AND III

The procedure of Example I was repeated again except that the number of equivalents of air for complete oxidation of $H_2S$ was doubled in Example II and tripled in Example III. The results are shown in Table I also.

EXAMPLE IV

The procedure of Example I was repeated again following the same procedures outlined except that only ⅔ of the ammonia equivalents according to Equation I were employed. These results are also shown in Table I.

EXAMPLES V AND VI

Following the same procedure and using one equivalent each of air and ammonia in Example V, a sour crude petroleum was sweetened with the results shown in Table I. In Example VI twice the ammonia equivalents were used.

Table I

| Example | Oil, cc./min. | Air, cc./min. | $NH_3$, cc./min. | $H_2S$ in sweet crude product, p.p.m. | $H_2S$ (gas) percent | Equivalents[1] Air | Equivalents[1] $NH_3$ |
|---|---|---|---|---|---|---|---|
| I | 25 | 25 | 15 | 20 | 0.1 | 1 | 1 |
| II | 25 | 50 | 15 | 15 | 0.07 | 2 | 1 |
| III | 50 | 150 | 30 | 20 | 0.10 | 3 | 1 |
| IV | 50 | 50 | 20 | 90 | 0.8 | 1 | ⅔ |
| V | 50 | 50 | 30 | 110 | 1.0 | 1 | 1 |
| VI | 50 | 50 | 60 | 100 | 1.0 | 1 | 2 |

[1] Stoichiometric equivalents of oxygen as air and ammonia required for oxidation of $H_2S$ to S according to Equations I and II, above.

The data in the above examples show that there is a substantial decrease in the $H_2S$ content of a sour crude when treated according to the method of this invention. The data also show that a substantial decrease is achieved even when less than theoretical equivalents of $NH_3$ are employed, thus indicating that the ammonia has a catalytic effect on the reaction. Further the data show that increasing the amounts of ammonia above the theoretical equivalent according to Equation I does not appreciably increase the reduction of the hydrogen sulfide concentration.

EXAMPLE VII

Essentially the same procedures as outlined in Example I were followed again using the same amount of reactants as shown in Example IV. The liquid crude and gas effluent were alalyzed for their H₂S content with 90 p.p.m. H₂S again being detected in the processed crude and 0.8% H₂S in the gas effluent. After the column was thus stabilized, the flow of ammonia to the column was discontinued with no change in the introduction of air and crude oil. The crude product was periodically analyzed after the flow of ammonia was discontinued with the following results:

| Time (min.) | 0 | 25 | 60 | 90 | 180 | 210 |
|---|---|---|---|---|---|---|
| H₂S in crude, p.p.m. | 90 | 83 | 130 | 216 | 224 | 203 |

These results show the importance of the presence of NH₃ in the reaction. For instance it took only one hour before a rise in the H₂S value was observed.

EXAMPLE VIII

A sour crude petroleum having a hydrogen sulfide content of about 350 p.p.m. was pre-mixed with air and ammonia and fed to the bottom of a mild steel column 20 feet in height and having a diameter of 1 foot and packed with stainless steel wool to a density of about 5 lbs./ft.³. Sour crude oil was charged at the rate of 103 barrels per day (b.p.d.). Ammonia and oxygen as air were present in amounts of 1.0 and 10 stoichiometric equivalents, respectively, according to the equations. The packed column was maintained at a pressure of 10 p.s.i.g. and a temperature of 110° F. The sweetened crude petroleum liquid effluent was analyzed for hydrogen sulfide content which was found to be 90 p.p.m. for a 74 percent reduction of the hydrogen sulfide concentration of the sour crude.

EXAMPLES IX–XII

The packed column of Example VIII was charged with a sour crude petroleum containing 350 p.p.m. H₂S and about 1.5–2% sulfur which was pre-mixed with ammonia. The crude was introduced to the bottom of the column at various rates shown below in Table II. Ammonia was present in varying stoichiometric equivalents. Oxygen as air was introduced at the bottom of the column to give the concurrent air flow rates also listed below. The column was maintained at a pressure of 45 p.s.i.g. and a temperature between 95 and 110° F. The sweetened liquid crude petroleum effluent was analyzed for hydrogen sulfide content. The results are listed below.

*Table II*

| Example | Oil, b.p.d. | Air equiv-alents | NH₃ equiv-alents | H₂S in processed crude, p.p.m. |
|---|---|---|---|---|
| IX | 240 | 10 | 0.5 | 70 |
| X | 103 | 10 | 2.0 | 29 |
| XI | 172 | 12 | 0.5 | 22 |
| XII | 52 | 10 | 0.5 | 13 |

The amount of corrosion of the column was checked with a corrosometer and found to be less than 2 mils per year. A reduction of the gravity of the crudes was only about 0.2° API. These data also show that a substantial decrease in the H₂S content of a liquid sour crude can be advantageously achieved according to the process of the instant invention. The data also indicate that especially favorable results are achieved when the reactants are pre-mixed before being introduced to the column and when the column is operated with concurrent flow of reactants.

EXAMPLES XIII–XIV

Sour crude petroleum having a hydrogen sulfide contents as indicated below in Table III was fed to the base of a reactor 12.5 feet in diameter and 51 feet high containing 15 bubble-cap trays. Ammonia and air were also introduced into the base of the column in the amounts also indicated below. The equivalents of ammonia and oxygen as air are again the stoichiometric equivalents required in the reaction according to Equations I and II above. The gases and liquids passed concurrently upward through the bubble-cap column and into an associated separator vessel where off-gas was vented to the atmosphere. The sweetened crude oil was pumped to tankage. The operating conditions of the column and the results of the tests are given below in Table III.

*Table III*

| Example | Sour crude feed rate (m.b.p.d.) | Temp. of column (° F.) | Pressure of column (p.s.i.a.) | Residence time (min.) | Air equiv-alents | NH₃ equiv-alents | Water, wt. percent | H₂S in crude In p.p.m. | H₂S in crude Out p.p.m. | H₂S removal, percent |
|---|---|---|---|---|---|---|---|---|---|---|
| XIII | 20 | 101 | 58 | 57.6 | 11.4 | 0.55 | 0 | 224 | 56 | 75.0 |
| XIV | 20 | 89 | 73 | 57.6 | 12.7 | 1.4 | 0 | 202 | 61 | 69.8 |

The results of these tests when compared to the results obtained in the packed column tests indicate that a more efficient sweetening operation is achieved in a packed column. The data again indicate that less than the stoichiometric equivalent of ammonia produces satisfactory H₂S removal percentages, thus confirming the proposition that ammonia acts as a catalyst in the liquid crude sweetening process. The tests also show that the presence of water is not essential to the process.

EXAMPLE XV

A sour crude petroleum having a hydrogen sulfide content of 262 p.p.m. was sweetened according to the process and in a column as described in Examples XIII–XIV. 1.1 equivalents of ammonia and 5 equivalents of oxygen as air, according to the equations, were also introduced into the base of the column and the gases and liquid crude passed concurrently upward through the bubble-cap column into an associated separator vessel. The residence time in the column was 57.6 minutes. The column was maintained at a temperature of 74° F. and a mean pressure of 52 p.s.i.a. A sample of the crude was analyzed and the H₂S content was found to be 116 p.p.m., for a 55.7 percent reduction. From the separator vessel and without venting off-gas to the atmosphere, the crude was pumped through about 2500 feet of 14″ pipe to tankage. The residence time in the pipe was 35.9 minutes. The crude leaving the pipeline was analyzed and the H₂S content found was 72 p.p.m. for an additional 38 percent reduction or an overall 72 percent reduction of the H₂S in the feed initially charged to the column.

EXAMPLE XVI 820 barrels of a sour crude petroleum having a specific gravity of 37.2° API at 60° F. a hydrogen sulfide content of 166 p.p.m. and maintained at a temperature of 63° F. was introduced into a large open vessel to which 0.4 equivalents of ammonia were added and through which 2,500 standard cubic feet per hour of air were bubbled. The crude was periodically analyzed for H₂S content with the following results:

| Time | | H₂S in crude p.p.m. |
|---|---|---|
| Hrs. | Min. | |
| 0 | 0 | 166 |
| 1 | 0 | 133 |
| 2 | 30 | 83 |
| 3 | 30 | 52 |

When the crude was analyzed 52 p.p.m. H₂S, i.e. a 68% reduction of the dissolved H₂S, the flow of air was discontinued. After a 17 hour storage period the crude was again analyzed and the H₂S content had been further reduced to 19 p.p.m. for a 63 percent reduction of the H₂S content or an overall 81 percent reduction. The specific gravity of the sweetened crude was 36.5° API at 60° F.

Thus the foregoing examples show the effectiveness of using small quantities of ammonia together with an oxygen containing gas to reduce the hydrogen sulfide content of a sour crude petroleum.

We claim:

1. A process of decreasing the hydrogen sulfide content of a sour liquid crude petroleum which comprises contacting said sour liquid crude petroleum with a catalyst consisting essentially of ammonia and with an oxygen-containing gas to oxidize the hydrogen sulfide to a material which is innocuous during subsequent handling and transportation of the crude.

2. The process of claim 1 wherein the mole ratio of oxygen in the oxygen-containing gas to hydrogen sulfide is about 0.5–7:1 and the mole ratio of ammonia to hydrogen sulfide about 0.2–2:1.

3. The process of decreasing the hydrogen sulfide content of a sour crude petroleum in the liquid phase which comprises passing the liquid crude and an oxygen-containing gas together with a catalyst consisting essentially of ammonia concurrently through a mass of solid packing material maintained within a contact zone to oxidize said hydrogen sulfide and recovering a liquid crude substantially reduced in hydrogen sulfide content.

4. The process of claim 3 wherein the mole ratio of oxygen in the oxygen-containing gas to hydrogen sulfide is about 0.5–7:1 and the mole ratio of ammonia to hydrogen sulfide about 0.2–2:1.

5. The process of claim 3 wherein the mole ratio of oxygen in the oxygen-containing gas to hydrogen sulfide is about 2–4:1 and the mole ratio of ammonia to hydrogren sulfide is about 0.8–1.2:1.

6. The process of decerasing the hydrogen sulfide content of a sour liquid crude petroleum confined in a pipeline which comprises contacting said confined liquid crude with an oxygen-containing gas, the mole ratio of oxygen in said oxygen-containing gas to said hydrogen sulfide being about 0.5–7:1, and with a catalyst consisting essentially of ammonia, the mole ratio of ammonia to hydrogen sulfide being about 0.2–2:1, to oxidize said hydrogen sulfide and recovering a liquid crude substantially reduced in hydrogen sulfide content.

7. The process of claim 6 wherein the mole ratio of oxygen in the oxygen-containing gas to hydrogen sulfide is about 1–2.5:1 and the mole ratio of ammonia to hydrogen sulfide is about 0.8–1.2:1.

8. The process for sweetening sour liquid crude pepetroleum containing hydrogen sulfide which comprises reacting said sour liquid crude petroleum with an oxidizing gas in contact with a catalyst consisting essentially of ammonia.

9. The process of claim 8 wherein the oxidizing agent is air supplied in amounts of about 2 to 30 times greater by weight than the hydrogen sulfide content of said crude petroleum and the ammonia catalyst is supplied in amounts of about 0.1 to 1.0 times the weight of the hydrogen sulfide present.

References Cited by the Examiner

UNITED STATES PATENTS

| 1,423,712 | 7/1922 | Clancy | 208—236 |
| 1,971,172 | 8/1934 | Benedict | 208—236 |
| 2,253,011 | 8/1941 | Benedict | 208—208 X |
| 2,828,247 | 3/1958 | Bowers | 208—207 X |
| 2,853,431 | 9/1958 | Bowers | 208—207 |

FOREIGN PATENTS 596,358  4/1960  Canada.

DELBERT E. GANTZ, *Primary Examiner.*

ALPHONSO D. SULLIVAN, *Examiner.*

R. H. SHUBERT, *Assistant Examiner.*